(12) United States Patent
Kang et al.

(10) Patent No.: US 9,810,909 B2
(45) Date of Patent: Nov. 7, 2017

(54) HEAD-MOUNTED DISPLAY APPARATUS

(71) Applicant: SAMSUNG DISPLAY CO., LTD., Yongin, Gyeonggi-Do (KR)

(72) Inventors: Seock-Hwan Kang, Yongin (KR); Hong-Shik Shim, Yongin (KR); Won-Sang Park, Yongin (KR)

(73) Assignee: Samsung Display Co., Ltd., Yongin-si (KR)

( * ) Notice: Subject to any disclaimer, the term of this patent is extended or adjusted under 35 U.S.C. 154(b) by 0 days.

(21) Appl. No.: 14/599,439

(22) Filed: Jan. 16, 2015

(65) Prior Publication Data

US 2016/0033769 A1    Feb. 4, 2016

(30) Foreign Application Priority Data

Jul. 29, 2014    (KR) .................. 10-2014-0096760

(51) Int. Cl.
*G02B 3/08* (2006.01)
*G02B 27/01* (2006.01)

(52) U.S. Cl.
CPC .......... *G02B 27/0172* (2013.01); *G02B 3/08* (2013.01); *G02B 2027/0127* (2013.01); *G02B 2027/0129* (2013.01); *G02B 2027/0174* (2013.01); *G02B 2027/0178* (2013.01)

(58) Field of Classification Search
CPC .................. G02B 27/0172; G02B 3/08; G02B 2027/0174; G02B 2027/0178; G02B 26/0816; G02B 27/0103; G02B 2027/0138; G02B 2027/0127; G02B 2027/014; G02B 5/003; G02B 5/3083; G02B 27/0093; G02B 27/286; G02B 2027/0118; G06F 1/163; G06F 3/011; G06F 3/012; G06F 3/013; G06F 3/017; G06F 3/005; G06T 19/006; G06K 9/00664; H04N 5/23222; H04N 2213/008
USPC .... 359/13, 630, 292, 556, 15, 618; 345/7–8, 345/633, 419; 353/8, 31; 349/11, 95, 349/515
See application file for complete search history.

(56) References Cited

U.S. PATENT DOCUMENTS

| | | | |
|---|---|---|---|
| 6,275,254 B1 * | 8/2001 | Beeteson | H01J 29/68 313/409 |
| 6,751,026 B2 | 6/2004 | Tomono | |
| 8,508,830 B1 | 8/2013 | Wang | |
| 2004/0085648 A1 * | 5/2004 | Tomono | G02B 27/0172 359/631 |
| 2005/0195491 A1 | 9/2005 | Bernard et al. | |
| 2013/0278485 A1 | 10/2013 | Kim et al. | |
| 2014/0043320 A1 * | 2/2014 | Tosaya | G02B 27/0172 345/419 |

* cited by examiner

*Primary Examiner* — Scott J Sugarman
*Assistant Examiner* — Ibrahima Diedhiou
(74) *Attorney, Agent, or Firm* — Lewis Roca Rothgerber Christie LLP

(57) ABSTRACT

A head-mounted display apparatus includes a display unit including a substrate and display elements, and an optical element. The substrate includes a plurality of display portions and a plurality of light-transmitting portions, and the display elements are on the plurality of display portions of the substrate. The optical element is in an optical path of light that is emitted from the display unit and has through-holes that respectively correspond to the plurality of light-transmitting portions.

18 Claims, 5 Drawing Sheets

HEAD-MOUNTED DISPLAY APPARATUS

CROSS-REFERENCE TO RELATED APPLICATION

This application claims priority to and the benefit of Korean Patent Application No. 10-2014-0096760, filed on Jul. 29, 2014, in the Korean Intellectual Property Office, the disclosure of which is incorporated herein in its entirety by reference.

BACKGROUND

1. Field

One or more embodiments of the present invention relate to a head-mounted display apparatus.

2. Description of the Related Art

In general, a head-mounted display apparatus that has a glasses-like shape or a helmet-like shape and may be mounted on a user's head enables the user to perceive an image that is displayed in front of the user's eyes. Research on a see-through head-mounted display apparatus that enables a user to perceive not only an image that is displayed in front of the user's eyes but also a background at the rear side of the see-through head-mounted display apparatus has been carried out.

SUMMARY

In a conventional see-through head-mounted display apparatus, a focal length when a user perceives an image that is displayed in front of the user's eyes (e.g., is displayed on the display apparatus) and a focal length when the user perceives a background at the rear side of the see-through head-mounted display apparatus are different from each other, thereby leading to the user's eyestrain.

One or more embodiments of the present invention include a see-through head-mounted display apparatus that may reduce a user's eyestrain by reducing parallax.

Additional aspects of embodiments of the present invention will be set forth in part in the description which follows and, in part, will be apparent from the description or may be learned by practice of the presented embodiments.

According to one or more embodiments of the present invention, a head-mounted display apparatus includes: a display unit including a substrate and display elements, the substrate including a plurality of display portions and a plurality of light-transmitting portions, and the display elements being on the plurality of display portions of the substrate; and an optical element in an optical path of light that is emitted from the display unit and having through-holes that respectively correspond to the plurality of light-transmitting portions.

The plurality of display portions may be spaced from each other, and the light-transmitting portions may be between respective ones of the plurality of display portions.

The display elements may be non-transmitting elements.

The optical element may be configured to focus light emitted from the display elements onto a preset point. The optical element may be a Fresnel lens having the through-holes or may be a holographic optical element (HOE) having the through-holes.

The plurality of display portions may be a plurality of parallel, linear shapes that are spaced from each other.

The head-mounted display apparatus may further include a frame accommodating the display unit and the optical element and configured to be placed on a user's head.

BRIEF DESCRIPTION OF THE DRAWINGS

These and/or other aspects will become apparent and more readily appreciated from the following description of example embodiments of the present invention, taken in conjunction with the accompanying drawings in which.

DETAILED DESCRIPTION

Figure 1:
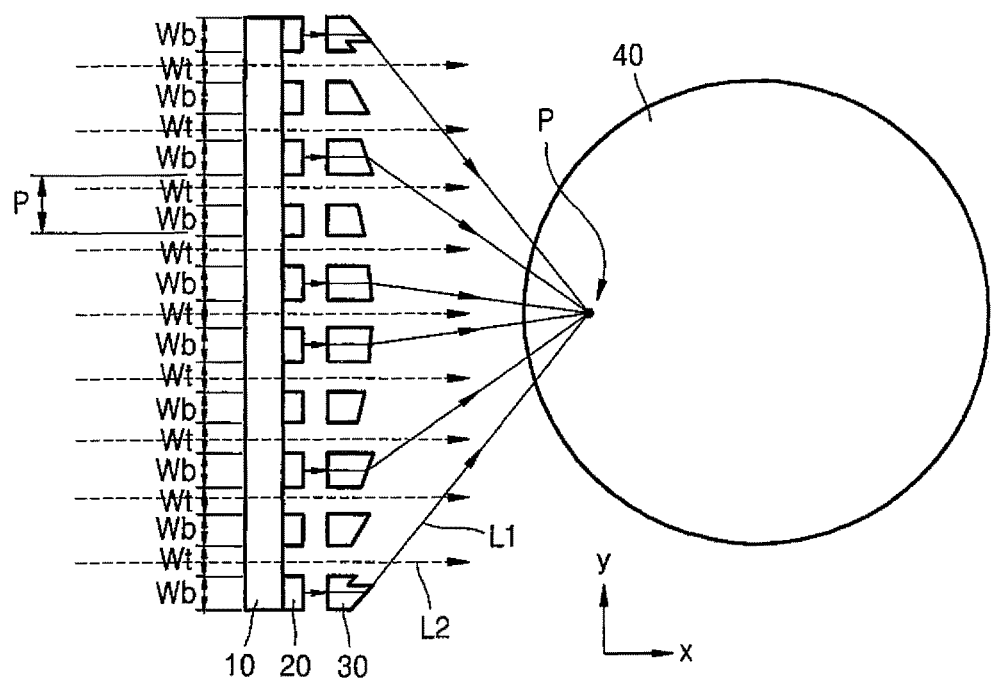
FIG. 1 is a side-sectional view illustrating a head-mounted display apparatus according to an embodiment of the present invention.

As used herein, the term "and/or" includes any and all combinations of one or more of the associated listed items. Expressions such as "at least one of," when preceding a list of elements, modify the entire list of elements and do not modify the individual elements of the list.

The present invention may include various embodiments and modifications, and exemplary embodiments thereof will be illustrated in the drawings and will be described herein in detail. The aspects and features of embodiments of the present invention and the accompanying methods thereof will become apparent from the following description of the example embodiments, taken in conjunction with the accompanying drawings. However, the present invention is not limited to the embodiments described below and may be embodied in various, different ways.

It will be understood that when a layer, film, region, or plate is referred to as being "on" or "formed on" another layer, film, region, or plate, it may be directly or indirectly on or formed on the other layer, film, region, or plate. That is, for example, intervening layers, films, regions, or plates may be present. In the figures, sizes of elements may be exaggerated for convenience of explanation. In other words, because sizes and thicknesses of elements in the drawings may be arbitrarily illustrated for convenience of explanation, the following embodiments are not limited thereto. Further, when an element is referred to as being "coupled to" or "connected to" another element, it can be directly coupled to or connected to the other element or indirectly coupled to or connected to the other element with one or more intervening elements interposed therebetween.

In the following examples, the x-axis, the y-axis, and the z-axis are not limited to three axes of the rectangular coordinate system and may be interpreted in a broader sense. For example, the x-axis, the y-axis, and the z-axis may be perpendicular to one another or may represent different directions that are not perpendicular to one another.

FIG. 1 is a side-sectional view illustrating a head-mounted display apparatus according to an embodiment of the present invention.

Referring to FIG. 1, the head-mounted display apparatus includes a display unit and an optical element 30. The display unit includes a substrate 10 and display elements 20 that are on (e.g., disposed on) the substrate 10.

The substrate 10 may be formed of one or more of various suitable materials, for example, a glass material or a plastic material, such as polyethylene terephthalate (PET), polyethylene naphthalate (PEN), or a polyimide. The substrate 10 is a light-transmitting substrate. The substrate 10 includes a plurality of display portions Wb and light-transmitting portions Wt. For example, the substrate 10 includes the plurality of display portions Wb that are spaced from (e.g., spaced apart from) each other and includes the light-transmitting portions Wt that are portions between ones of the plurality of display portions Wb. Although the light-transmitting portions Wt are the portions between ones of the plurality of display portions WB, the light-transmitting portions Wt may not entirely fill the portions between ones of the plurality of display portions Wb. For example, the light-transmitting portions Wt may partially correspond to the portions between ones of the plurality of display portions Wb.

The plurality of display portions Wb that are spaced from each other may have one or more of various suitable patterns. For example, the plurality of display portions Wb may have a plurality of parallel, linear shapes that extend in one direction (e.g., a Z-direction).

The display elements 20 are on the plurality of display portions Wb of the substrate 10. The display elements 20 may include one or more of various suitable elements, for example, organic light-emitting display elements. When the substrate 10 is flexible and the organic light-emitting display elements are formed on the substrate 10, the display unit is flexible, and the head-mounted display apparatus having various radii of curvature (e.g., preset or predetermined radii of curvature) may be easily manufactured.

The optical element 30 is in an optical path of light L1 that is emitted from the display unit (e.g., from the display elements 20). The optical element 30 is positioned such that the light L1 that is emitted from the display elements 20 passes through the optical element 30 before reaching a user's eyeball 40. The optical element 30 is a light-transmitting element. Although the optical element 30 is spaced from (e.g., spaced apart from) the display elements 20 in FIG. 1, the present invention is not limited thereto. For example, when the display elements 20 are positioned in an encapsulation substrate or in an encapsulation film that is coupled to the substrate 10, the optical element 30 may be coupled to (e.g., attached to) the encapsulation substrate or the encapsulation film.

The display elements 20 of the head-mounted display apparatus are positioned in front of the user's eyeball 40 when the head-mounted display apparatus is placed on the user's head. However, because a shortest focal length for a person's eyes is generally about 20 cm, if the display elements 20 are not spaced about 20 cm or more from the user's eyeball 40, it is difficult for the user to easily perceive an image that is displayed on the display unit including the display elements 20. Accordingly, the head-mounted display apparatus may have a problem in that, in order for the display unit to be spaced about 20 cm or more from the user's eyes, a volume of the head-mounted display apparatus is increased.

However, because the head-mounted display apparatus illustrated in FIG. 1 includes the optical element 30 that is positioned in the optical path of the light L1 that is emitted from the display unit, and because the optical element 30 has substantially the same or identical effects as, for example, a convex lens, even when a distance between the display unit and the user's eyes is less than about 20 cm, the user may clearly and easily perceive an image that is displayed on the display unit. For example, the optical element 30 may focus the light L1 that is emitted from the display elements 20 on or to a preset point P, for example, a lens of the user's eyeball 40.

When a volume of the optical element 30 increases, a volume of the head-mounted display apparatus increases as well. Accordingly, it is desirable to reduce the volume of the optical element 30. To this end, the optical element 30 may include a Fresnel lens or a holographic optical element ("HOE") (e.g., an HOE lens).

The optical element 30 may be patterned to correspond to the plurality of display portions Wb of the substrate 10. The optical element 30 is patterned to correspond to the plurality of display elements 20 in FIG. 1. Accordingly, the light L1 that is emitted from the plurality of display elements 20 may pass through the optical element 30 before reaching the user's eyeball 40, and thus, even when a distance between the display elements 20 and the user's eyeball 40 is less than about 20 cm, the user may clearly and easily perceive an image that is displayed on the display unit including the display elements 20.

Because the substrate 10 is a light-transmitting substrate, light L2 that is emitted or reflected from a background at the rear side of the head-mounted display apparatus may pass through the light-transmitting portions Wt of the substrate 10 and may then pass through the display unit and may reach the user's eyeball 40. That is, the head-mounted display apparatus illustrated in FIG. 1 may be a see-through head-mounted display. apparatus. In this embodiment, the light L2 that is emitted or reflected from the background at the rear side of the head-mounted display apparatus may pass through the light-transmitting portions Wt of the substrate 10 and may reach the user's eyeball 40 without passing through the optical element 30.

For example, because the optical element 30 is patterned to correspond to the plurality of display portions Wb of the substrate 10 and has through-holes 30a (see FIG. 3) corresponding to the light-transmitting portions Wt of the substrate 10, the light L2 that is emitted or reflected from the background at the rear side of the head-mounted display apparatus may pass through the light-transmitting portions Wt of the substrate 10 and may then pass through the through-holes 30a of the optical element 30 and may then reach the user's eyeball 40. Accordingly, the light L2 that is emitted or reflected from the background at the rear side of the head-mounted display apparatus (e.g., light that is emitted or reflected from the background at the rear side of the head-mounted display apparatus which passes through the light-transmitting portions Wt of the substrate 10) may reach the user's eyeball 40 without being refracted by the optical element 30, such as how light reaches the user's eyeball 40 when the user is not using the head-mounted display apparatus.

Accordingly, when the head-mounted display apparatus illustrated in FIG. 1 is used, a focal length when the user perceives the image that is displayed in front of the user's eyes (e.g., when the user perceives the image that is displayed by the head-mounted display apparatus) and a focal length when the user perceives the background at the rear side of the head-mounted display apparatus are not greatly or substantially different from each other, thereby preventing or greatly reducing the user's eyestrain.

Figure 2:
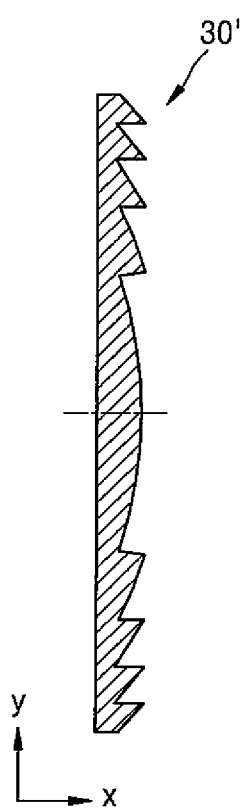
FIGS. 2 and 3 are side-sectional views illustrating a process of manufacturing an optical element of the head-mounted display apparatus illustrated in FIG. 1.
Figure 3:
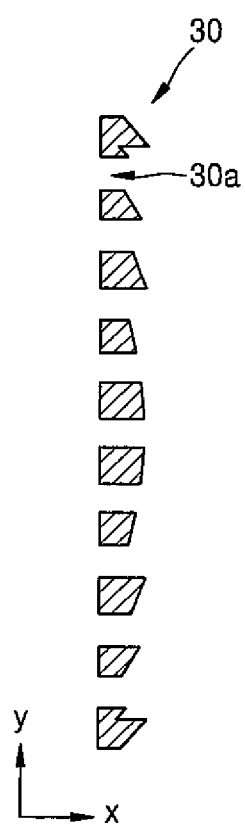

The optical element 30 may be manufactured by using a process illustrated in FIGS. 2 and 3. When the optical element 30 includes a Fresnel lens 30', the Fresnel lens-type optical element 30 including the through-holes 30a may be manufactured by first manufacturing the Fresnel lens 30' as shown in FIG. 2 and then removing a portion or portions (e.g., a preset or predetermined portion or portions) of the Fresnel lens 30' by performing patterning or the like (e.g., by etching) as shown in FIG. 3.

A process of manufacturing the optical element 30 to have a shape such as that shown in FIG. 3 from the beginning (e.g., without performing the patterning or the like) is typically very complicated and the process or equipment for manufacturing the optical element 30 is typically changed whenever a size or a resolution of the head-mounted display apparatus is changed or varied. However, when the Fresnel lens 30' is first manufactured and the portion or portions (e.g., the preset or predetermined portion or portions) is then removed from the Fresnel lens 30' as shown in FIGS. 2 and 3, the optical element 30 including the through-holes 30a may be easily manufactured because only a process of removing the portion needs to be controlled. Also, even when a size or a resolution of the head-mounted display apparatus changes or varies, because the Fresnel lens 30' may be manufactured without being changed and only a subsequent process of removing the portion needs to be changed, manufacturing efficiency may be greatly improved.

Unlike in FIG. 3, the through-holes 30a may not be formed at an edge of the optical element 30 (e.g., may not be formed around the entire optical element 30), and the optical element 30 may be integrally formed in order to be easily handled. Alternatively, the portion may be removed from the Fresnel lens 30' in a state in which the Fresnel lens 30' illustrated in FIG. 2 is coupled to the display unit (e.g., coupled to the substrate 10). Furthermore, the present invention is not limited to the Fresnel lens 30', and as long as the light L1 that is emitted from the display elements 20 may be focused on a preset point or position, such as an eye lens in the user's eyeball 40, any of various suitable optical elements such as an HOE, a micro lens array, or a prism may be used, for example, by being patterned.

The display elements 20 that are on the plurality of display portions Wb of the substrate 10 may be non-transmitting elements (e.g., may not allow external light to be transmitted therethrough). If the display elements 20 are light-transmitting elements, light from among the light L2 that is emitted or reflected from the background at the rear side of the head-mounted display apparatus passes through the display elements 20, is refracted by the optical element 30, and then reaches the user's eyeball 40.

For example, if the display elements 20 are light-transmitting elements, part of the light L2 that is emitted or reflected from the background at the rear side of the head-mounted display apparatus passes through the through-holes 30a of the optical element 30 and then reaches the user's eyeball 40, and another part of the light L2 passes through a portion other than the through-holes 30a of the optical element 30, is refracted by the optical element 30, and then reaches the user's eyeball 40. In this case, the user may not correctly perceive the background at the rear side of the head-mounted display apparatus. Accordingly, the display elements 20 that are on the plurality of display portions Wb of the substrate 10 should be non-transmitting elements (e.g., should not transmit external light therethrough). In this sense, the plurality of display portions Wb of the substrate 10 may be referred to as blocking portions.

When the display elements 20 are non-transmitting elements, each of the display elements 20 may include a pixel electrode including a non-transmitting material or each of the display elements 20 may include an electronic element, such as a thin-film transistor (TFT), a capacitor, or a wiring, that includes a non-transmitting material.

Figure 4:
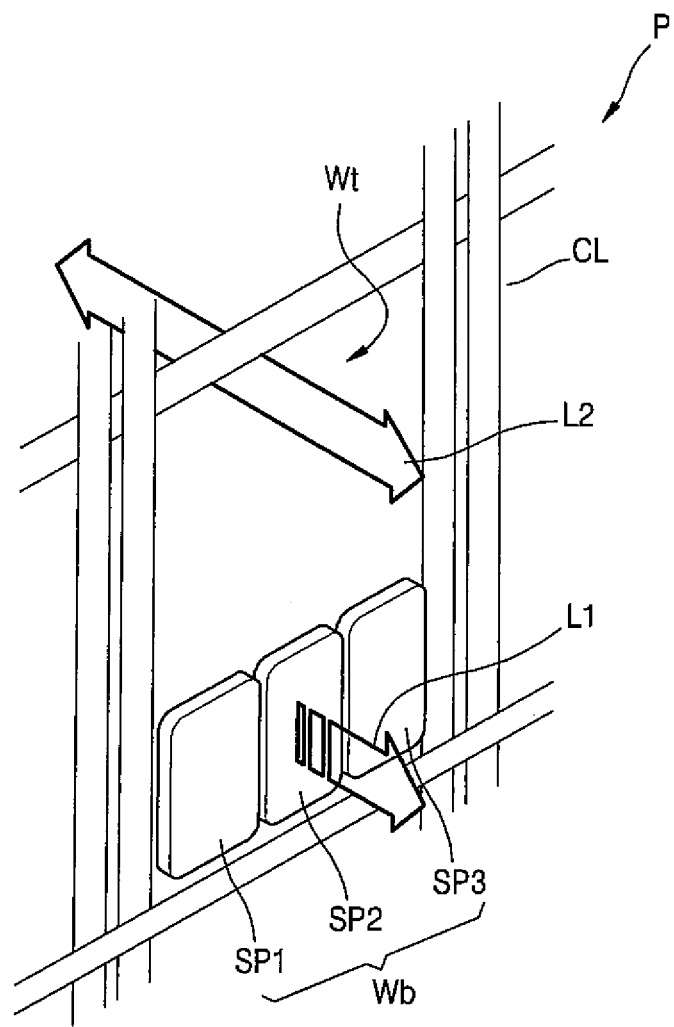
FIG. 4 is a conceptual perspective view illustrating a light-transmitting portion and a display portion of the head-mounted display apparatus illustrated in FIG. 1.

The light-transmitting portion Wt and the display portion Wb of the substrate 10 may be defined in various ways. FIG. 4 is a conceptual perspective view illustrating the light-transmitting portion Wt and the display portion Wb of the head-mounted display apparatus illustrated in FIG. 1 in one pixel P of the display unit. A portion of the substrate 10 on which the one pixel P is located may include both the display portion Wb and the light-transmitting portion Wt as shown in FIG. 1.

Referring to FIG. 4, the one pixel P may include, for example, three subpixels, and the one pixel P may include three display elements SP1, SP2, and SP3. In this embodiment, a portion of the substrate 10 on which the three display elements SP1, SP2, and SP3 are located may be defined as the display portion Wb, that is, for example, a blocking portion. The light L1 that is emitted from the display elements SP1, SP2, and SP3 passes through a portion other than the through-holes 30a of the optical element 30, is refracted by the optical element 30, and then reaches the user's eyeball 40.

Various wirings CL may be on the substrate 10 in order to apply an electrical signal to the display elements SP1, SP2, and SP3. A portion of the substrate 10 on which the wirings CL are disposed may also be defined as the display portion Wb. In this embodiment, a portion not occupied by the display elements SP1, SP2, and SP3 or the wirings CL may be defined as the light-transmitting portion Wt of the substrate 10.

Alternatively, because the wirings CL that are on the substrate 10 to apply an electrical signal to the display elements SP1, SP2, and SP3 are not elements for displaying an image (e.g., do not display an image), a portion of the substrate 10 on which the wirings CL are disposed may not be defined as the display portion Wb. For example, a portion of the substrate 10 on which the wirings CL are disposed may be defined as part of the light-transmitting portion Wt. In this embodiment, the light-transmitting portions Wt may be coupled to one another (e.g., arranged) on the substrate 10 to have a mesh shape. Alternatively, a portion of the substrate 10 on which the wirings CL are disposed may be defined as a third portion, for example, not the display portion Wb and not the light-transmitting portion Wt.

Figure 5:
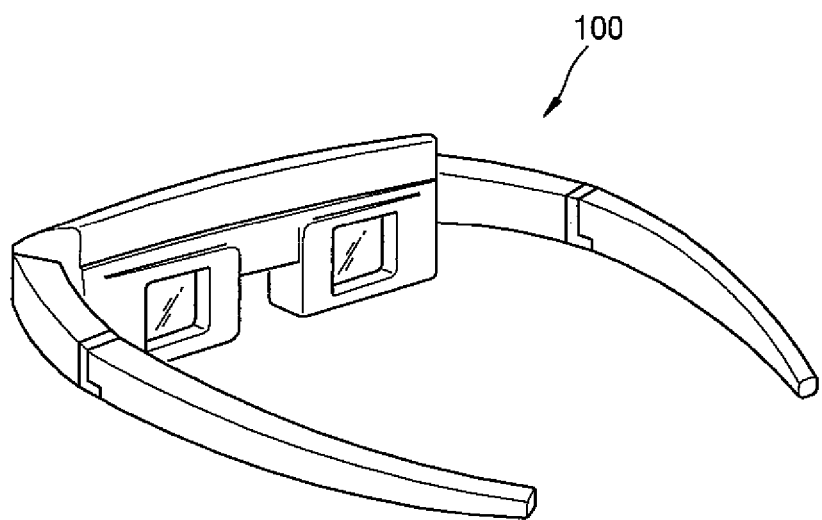
FIG. 5 is a perspective view illustrating a head-mounted display apparatus according to an embodiment of the present invention.

FIG. 5 is a perspective view illustrating a head-mounted display apparatus 100 according to an embodiment of the present invention. Referring to FIG. 5, the head-mounted display apparatus 100 includes a frame in which the optical element 30 and the display unit, including the substrate 10 and the display elements 20, are received and that is shaped to be placed on (e.g., mounted on) the user's head (e.g., worn by the user on her head).

Example embodiments of the head-mounted display apparatus have been explained. The term "head-mounted display apparatus" used herein refers to an apparatus that may be placed on (e.g., mounted on) a user's body and may display an image, and any apparatus that enables the user to observe a near image that is displayed on the apparatus may be included in examples of the head-mounted display apparatus, irrespective of its name or shape. The examples of the head-mounted display apparatus may include smart glasses, a helmet-mounted display apparatus, a computer-mediated reality apparatus, a mixed reality apparatus, a head-up display apparatus, an ultra-slim near-eye display ("NED") apparatus, and a wearable display apparatus.

As described above, according to one or more of the above example embodiments of the present invention, a see-through head-mounted display apparatus is provided that may reduce a user's eyestrain by reducing parallax. However, the scope of the present invention is not limited to such effects and characteristics.

While one or more example embodiments of the present invention have been described with reference to the figures, it will be understood by those of ordinary skill in the art that various changes in form and details may be made therein without departing from the spirit and scope of the present invention as defined by the following claims. Accordingly, the true technical scope of the present invention is defined by the technical spirit of the appended claims and their equivalents.

What is claimed is:

1. A head-mounted display apparatus comprising:
   a display unit comprising a substrate and display elements, the substrate comprising a plurality of display portions and a plurality of light-transmitting portions, and the display elements being on the plurality of display portions of the substrate; and
   an optical element in an optical path of light that is emitted from the display unit and having through-holes, the through-holes extending through the optical element along the optical path of light and respectively corresponding to the plurality of light-transmitting portions.

2. The head-mounted display apparatus of claim 1, wherein the plurality of display portions are spaced from each other, and the light-transmitting portions are between respective ones of the plurality of display portions.

3. The head-mounted display apparatus of claim 1, wherein the display elements are non-transmitting elements.

4. The head-mounted display apparatus of claim 1, wherein the optical element is configured to focus light emitted from the display elements onto a preset point.

5. The head-mounted display apparatus of claim 1, wherein the optical element is a Fresnel lens having the through-holes or is a holographic optical element (HOE) having the through-holes.

6. The head-mounted display apparatus of claim 1, wherein the plurality of display portions are a plurality of parallel, linear shapes that are spaced from each other.

7. The head-mounted display apparatus of claim 1, further comprising a frame accommodating the display unit and the optical element and configured to be placed on a user's head.

8. The head-mounted display apparatus of claim 1, wherein the display elements are only on the plurality of display portions of the substrate, and light passing through the light-transmitting portions passes between the display elements.

9. A head-mounted display apparatus comprising:
   a display unit comprising a substrate and display elements, the substrate comprising a plurality of display portions and a plurality of light-transmitting portions, the display elements being disposed on the plurality of display portions, respectively; and
   a plurality of optical elements disposed on the display elements, respectively,
   wherein the plurality of optical elements are spaced apart from each other, and an external light passing through the plurality of light-transmitting portions passes through areas between the plurality of optical elements.

10. A head-mounted display apparatus comprising:
    a substrate comprising a plurality of light-blocking display portions and a plurality of light-transmitting portions;
    a plurality of organic light-emitting display elements configured to emit light, adjacent ones of the display elements being spaced apart from each other, on the display portions of the substrate, and offset from the light-transmitting portions of the substrate; and
    an optical element in a path of the light that is emitted from the display elements, the optical element having a plurality of through-holes therein and being arranged adjacent to the display elements such that the through-holes are aligned with respective ones of the light-transmitting portions of the substrate and with respective spaces between the adjacent ones of the display elements such that external light passing through the light-transmitting portions of the substrate passes through the through-holes in the optical element.

11. The head-mounted display apparatus of claim 10, wherein the optical element is arranged such that the external light also passes through the spaces between the adjacent ones of the display elements.

12. The head-mounted display apparatus of claim 10, wherein the external light is not refracted by the optical element.

13. The head-mounted display apparatus of claim 10, wherein the optical element is a Fresnel lens.

14. The head-mounted display apparatus of claim 10, wherein the optical element is aligned with the display portions of the substrate and with the display elements such that the light emitted by the display elements is refracted by the optical element.

15. The head-mounted display apparatus of claim 14, wherein the optical element is a Fresnel lens.

16. The head-mounted display apparatus of claim 10, wherein the substrate is an outermost layer of the head-mounted display apparatus.

17. The head-mounted display apparatus of claim 1, wherein each of the display elements includes an organic light-emitting display element.

18. The head-mounted display apparatus of claim 9, wherein each of the display elements includes an organic light-emitting display element.

* * * * *